(12) United States Patent
Kirchev et al.

(10) Patent No.: US 8,839,223 B2
(45) Date of Patent: Sep. 16, 2014

(54) VALIDATION OF CURRENT STATES OF PROVISIONED SOFTWARE PRODUCTS IN A CLOUD ENVIRONMENT

(75) Inventors: Lazar Kirchev, Sofia (BG); Georgi Stanev, Sofia (BG)

(73) Assignee: SAP AG, Walldorf (DE)

( * ) Notice: Subject to any disclaimer, the term of this patent is extended or adjusted under 35 U.S.C. 154(b) by 240 days.

(21) Appl. No.: 13/448,473

(22) Filed: Apr. 17, 2012

(65) Prior Publication Data

US 2013/0275960 A1 Oct. 17, 2013

(51) Int. Cl.
*G06F 9/45* (2006.01)
*G06F 9/445* (2006.01)

(52) U.S. Cl.
USPC ............ 717/168; 717/178; 717/124; 717/131

(58) Field of Classification Search
None
See application file for complete search history.

(56) References Cited

U.S. PATENT DOCUMENTS 8,078,909 B1 * 12/2011 Satish ............................ 714/15

* cited by examiner

*Primary Examiner* — Chuck Kendall (57) ABSTRACT

In one aspect, a state file is received that describes a desired state of a provisioned software product started in a cloud environment. The state file defines the bundles to be installed and their desired state. The desired states of the bundles are read from the state file. Currently installed bundles, from the provisioned software product, are analyzed together with current states of the currently installed bundles. The specified bundles in the state file are compared to the currently installed bundles. The current states of the currently installed bundles are compared to the desired states from the state file to determine whether a current state of the provisioned software product corresponds to the desired state.

20 Claims, 8 Drawing Sheets

VALIDATION OF CURRENT STATES OF PROVISIONED SOFTWARE PRODUCTS IN A CLOUD ENVIRONMENT

BACKGROUND

Cloud computing is the delivery of computing resource as a service over a network (e.g., the Internet). There are a number of types of cloud computing solutions that have been developed. Software-as-a-Service (SaaS) is a type of a solution, where a cloud service provider allows software applications and various hardware and software resources to execute the software application when requested by an end user (e.g., customer). In that manner, a customer of an on-demand application is free from the procurement and maintenance of the hardware and software that is needed for the execution of the applications. On the other hand, Platform-as-a-Service (PaaS) is a category of cloud computing solutions that facilitates the development and deployment of on-demand applications and services. PaaS is a growing technology space offering possibilities for optimization of information technology (IT) spending. It provides facilities required to support the lifecycle of web applications and services, available from the Internet. Applications run as a SaaS on the infrastructure that is provided from a PaaS provider. PaaS may give application developers the tools to design, develop, test, deploy and host their software applications, as well as use provided application services and infrastructure. Practically, different applications require different services and capabilities from the underlying infrastructure. For example, it is often difficult to select the proper runtime components needed for an application to operate efficiently on a cloud Virtual Machine (VM).

Open Services Gateway initiative (OSGi™) technology is the dynamic module system for Java™. The OSGi™ provides a modular architecture that reduces complexity of today's large scale systems. If an OSGi™ application is developed, then it contains one or more bundles. When such an application is deployed on a given PaaS, it is expected to find it provisioned and stared on a VM, provided from the PaaS. Depending on the complexity of the solution, the provisioning or installation process may involve a series of tedious tasks prone to errors. Typically, there is no predictability of whether the provisioning process will be successful or not. For example, a failure in the installation at the last stages, failure to resolve or start bundles from an application, or that the starting operation had not finished.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for validation of current states of provisioned software products are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In one embodiment, applications can be developed based on available platforms or software products to provide new functionality. The platforms or software products can be provided by third parties. For example, such a platform can be an on-demand runtime platform that allows provisioning of an application in a cloud environment. A PaaS solution can provide an application runtime, user interface (UI) development toolkits, and platform services that can be adopted and used in the development of the application. In one embodiment, the installation and execution of the application may further require installation of one or more software products, which provide specific functionalities, for example, in the form of infrastructural (platform-provided) components, reused by the application. A provisioning process can prepare the application containing components (both application components and infrastructural components) together with the right configuration in the execution environment. In this manner, the total cost of ownership and the resource consumption would be optimized. In one embodiment, an infrastructural component can be a platform service such as an identity management and authentication service.

There are different technology solutions that may implement provisioning of applications in a cloud environment together with an existing platform product, e.g., an on-demand runtime platform. For example, the Equinox p2® provisioning platform for OSGi®-based applications. The p2® platform is part of the Equinox® project of Eclipse®. The Equinox p2® provisioning platform includes a general-purpose provisioning infrastructure that can be used for provisioning a variety of application.

In one embodiment, a consumer's request or another event may invoke the execution of a customer application in a cloud environment. The invocation can be a result of an event triggered by a developer of the customer application. According to the characteristics of the cloud environment, the invocation of the application may cause its deployment on the cloud, its installation and starting, together with the necessary runtime platform.

In one embodiment, a software application that is based on a PaaS (e.g. on-demand runtime platform) can be deployed, installed and started on virtual machines (VMs) and then can serve users' requests through a network. However, a provisioned application can be in an undesired state that can cause the application to not be operational. The reasons behind such a situation can be, for example, failed resolution between the application components and the platform-provided components, failure of the provisioned software product to start, etc. In one embodiment, a reliable mechanism can be provided, which can determine if a provisioned software product is in a desired state. The ability to determine whether the current state of a provisioned software product is desired or not at a particular time can be used when monitoring the product. Notifications can be sent when the software product is not in the desired state. In addition, such mechanism can be used during load balancing when provisioned products are monitored continually. When an application goes into an undesired state, the reserved computing resources can be allocated for other usage.

Figure 1:
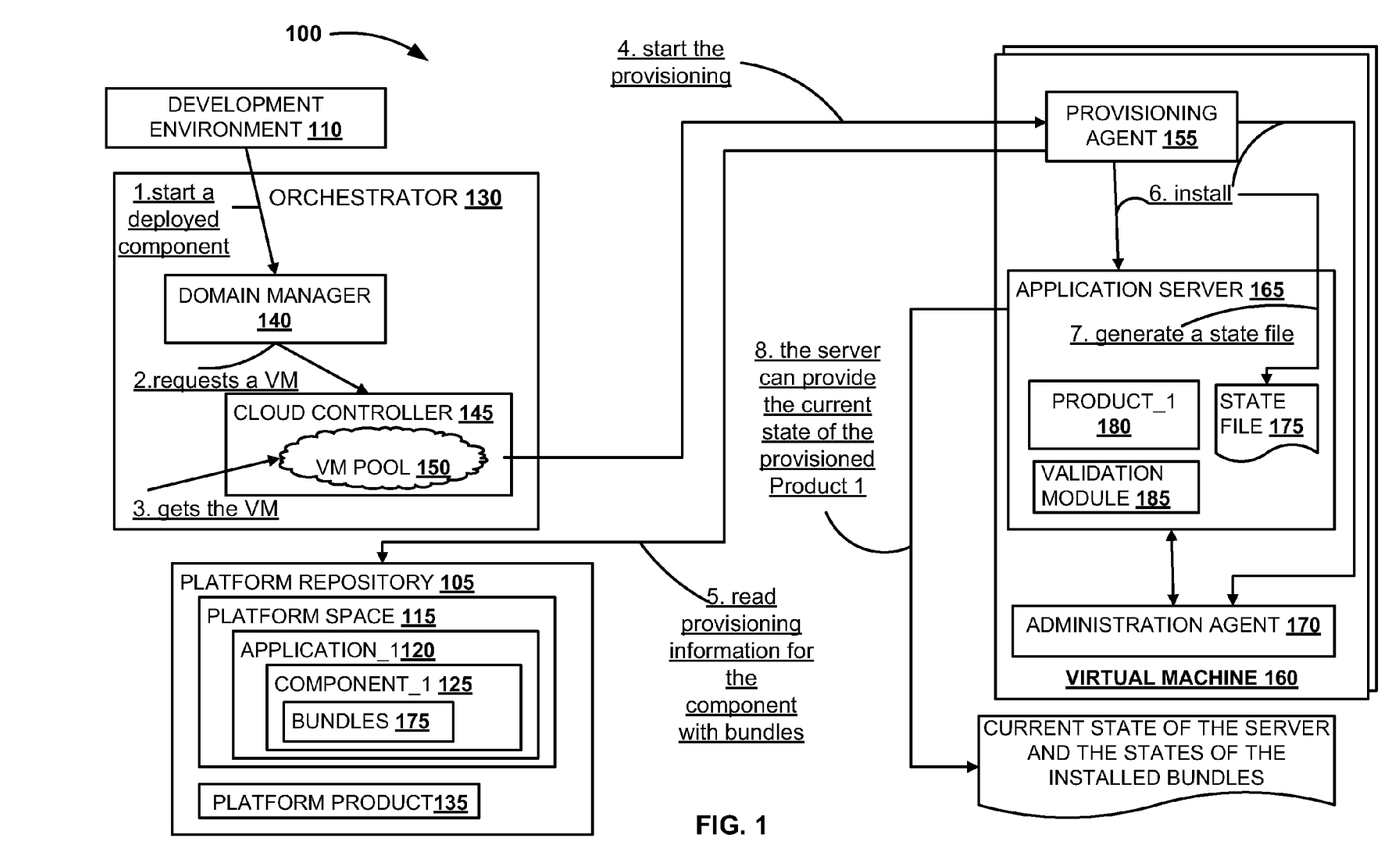
FIG. 1 is a block diagram illustrating an embodiment of an environment for starting a deployed software product in a cloud environment.

FIG. 1 is a block diagram illustrating an embodiment of an environment 100 for starting a deployed software product in a cloud environment. In one embodiment the deployed software product can be part of a software application that is developed using an on-demand runtime platform that provides services. For example, a web application developed and provisioned on an on-demand runtime platform can include two application components—one for the UI of the application and one for the business logic that lies behind the UI. The application runs as a Software-as-a-Service on top of the platform. Once an application is deployed, it is stored in a repository, for example, a platform repository 105. In the platform repository 105, there is a platform space 115, which contains deployed applications, for example, for a given provider of applications. In one embodiment, a space can be a logical entity for separation, such as an account that a customer of an on-demand platform can receive. For example, customers can use a space for their own business needs by creating different applications in the space. In one embodiment, an application_1 120 is part of the platform space 115. The application_1 120 can contain a couple of components. In one embodiment, a Component_1 125 is a component that is part of the application_1 120.

In one embodiment, the application may be provided in a repository, such as platform repository 105, as a combination of physical artifacts (for example, stored in one or more Java® archives or ".jar" files) and metadata. The metadata describes and configures the functionalities of the components from the application. The platform repository 105 can contain a platform product 135, which represents the functionality and capabilities provided by the on-demand runtime platform that is used for the development of the application_1 120. The platform product 135 may include a server that can be used for hosting deployed software applications and their components, enterprise services, etc. In one embodiment, the deployed software product can be an Eclipse®-based product. An Eclipse®-based product is a stand-alone program, e.g., self-contained and installable software, built using the Eclipse® development platform. A product may optionally be packaged and delivered as one or more of so called features. A feature may correspond to a particular functionality of the product or the application, and usually groups a number of unitary software components that could be managed together as a single entity. According to the terminology adopted in Eclipse® projects, such unitary software components are called plugins. The plugins are the basic installable and executable units or software code structures built by the Eclipse® developers. The plugins may include one or more bundles in the form of Java® ARchive (JAR or .jar) binary files. In another embodiment, the developed and deployed application can be an OSGi™ application including one or more OSGi™ bundles. The OSGi™ hides everything in the bundles unless explicitly exported.

The component_1 125 includes bundles 175. When provisioning a software product based on a platform product, such as component_1 at 125 and the platform product 135, the bundles 175 are installed, and in addition to that, part of the platform product 135 is also installed. The part of the platform product 135 that is installed when provisioning a component to install a software product on a VM, depends on the dependencies between the developed components and the infrastructural components that are provided from the platform product 135.

In one embodiment, the step to start a deployed software product can be triggered from a development environment 110. Eclipse® provides software development kit (SDK) that can be downloaded and used as Java® integrated development environment (IDE). By adding various enhancement, the Eclipse® platform could be used to develop applications in various programming languages, such as, but not limited to, Java®, Perl®, C®, C++®, PHP®, etc. A domain manager 140, that is part of an orchestrator 130 module, is called. In one embodiment, the orchestrator 130 can be a module part of the on-demand runtime platform used for provisioning the software product. The orchestrator 210 manages the lifecycle of the whole landscape. The domain manager 140 manages a list of running VMs that can be used for hosting a provisioned software product. The domain manager 140 collects information about the VMs by requesting a VM from a cloud controller 145. The cloud controller 145 has a VM pool 150 where a VM can be acquired. In one embodiment, if there is a free VM in the VM pool 150, the VM can be directly taken by the cloud controller. In another embodiment, if there are no free VMs, the cloud controller 145 can ask the infrastructure layer of the used on-demand runtime platform for a new VM. VM 160 is an exemplary VM that the cloud controller 145 can get from the VM pool 150. In one embodiment, VMs can have different types of operating systems working on them and can have a provisioning agent already installed, such as a provisioning agent 155. In one embodiment, the provisioning agent can be a provisioning infrastructure on a client machine.

In one embodiment, when the VM is chosen from the VM pool 150, the provisioning is started and the provisioning agent 155 from the VM 160 is notified to read the provisioning information and binaries from the platform repository 105. The provisioning agent 155 executes a script to install a server, such as an application server 165, and an administration agent 170, on the VM 160. The provisioning agent 155 takes from the platform repository 105 the bundles 175 that are part of the provisioned component_1 125 and also takes bundles from the platform product 135 that are used from the component_1 125, to formulate the software product that is provisioned on the VM 160. Typically, only one component (e.g. component_1 at 125) from the platform repository 105 can be provisioned on a single VM, such as the VM 160. A product_1 at 180 is the installed provisioned software product on the application server 165.

In one embodiment, during the installation that the provisioning agent 155 triggers on the VM 160 when the provisioned software product—product_1 at 180 is started, a state file 175 is created. The state file 175 contains a list with the bundles to be installed on the VM 160 for the product_1 180. The state file 175 presents for each of the bundles what is their desired state. In one embodiment, part of the installed bundles should also be activated, and another part of the bundles should be in a resolved state, when they have dependencies with other bundles. In one embodiment, bundles can change their state and the installed state is a temporary state that they have at first. Bundles in the installed state are waiting for their dependencies to be resolved, and once they are resolved, bundles move to the resolved state. In one embodiment, bundles can be in the resolved state when the packages imported by the bundle are exposed by the bundles that are either in the resolved state or that can be moved into the resolved state at the same time as the current bundle. In one embodiment, when bundles are activated they are available to function. What a bundle does in the active state depends on the contents of the bundle, for instance. On the application server 165, there is a validation module 185 which determines whether the current state of the provisioned software product (product_1 at 180) is in the desired state based on the defined desired state in the state file 175. Thus, the application server 165 can provide information from the validation made in the validation module 185 about the state of the provisioned software product.

Figure 2:
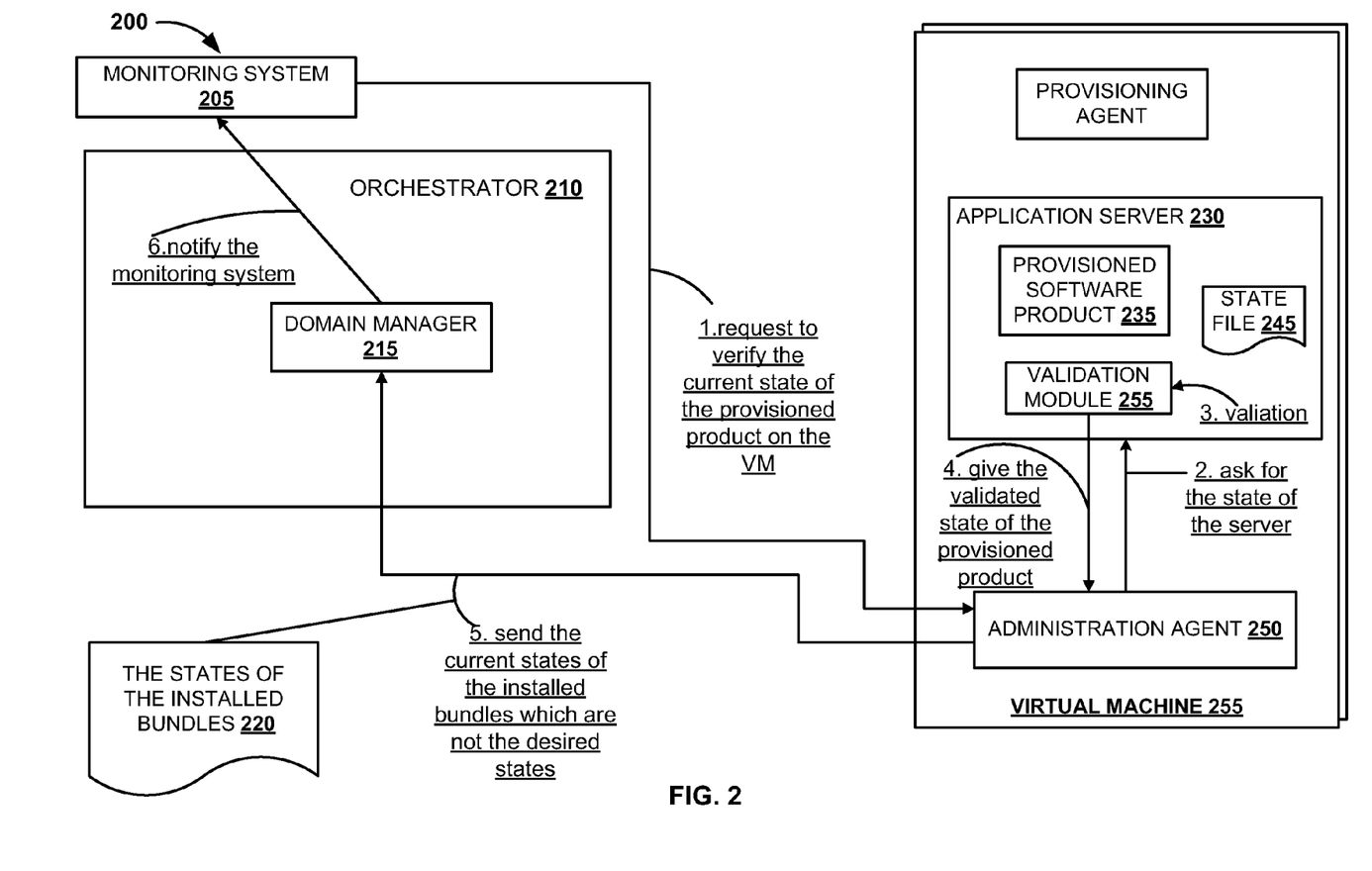
FIG. 2 is a block diagram illustrating an embodiment of an environment for monitoring a current state of a provisioned software product in a cloud environment.

FIG. 2 is a block diagram illustrating an embodiment of an environment 200 for monitoring a current state of a provisioned software product in a cloud environment. A monitoring system 205 sends a request to a VM 255 to check the current state of a provisioned software product 235 on an application server 230 in a cloud environment. The provisioned software product 235 can be one such as product_1 at 180 (FIG. 1). The request for the current state of the provisioned product 235 is handled by an administration agent 250 that asks the application server 230 for the server state. The application server 230 returns its state that includes the current states of the currently installed bundles on the application server 230 to the administration agent 250. The application server 230 can contain a validation module 255, such as the validation module 185, FIG. 1. The validation module 255 can validate the current states of the currently installed bundles by comparing them with the desired states of the bundles defined in a state file 245. In one embodiment, the validation module, as part of the application server 230, can send to the administration agent 250 the validated states of the bundles. The administration agent 250 sends notification to a domain manager 215 part of an orchestrator 210 with the current states of the currently installed bundles 220. The orchestrator 210 can be such as the orchestrator 130 in FIG. 1. The domain manager 215 notifies the monitoring system 205 about the current state of the provisioned software product 235 on the VM 255. The frequency of the requests that the monitoring system 205 can make can depend on a defined number of requests that satisfies the prescription of the providers of software products that is developed based on an exemplary on-demand runtime platform.

Figure 3:
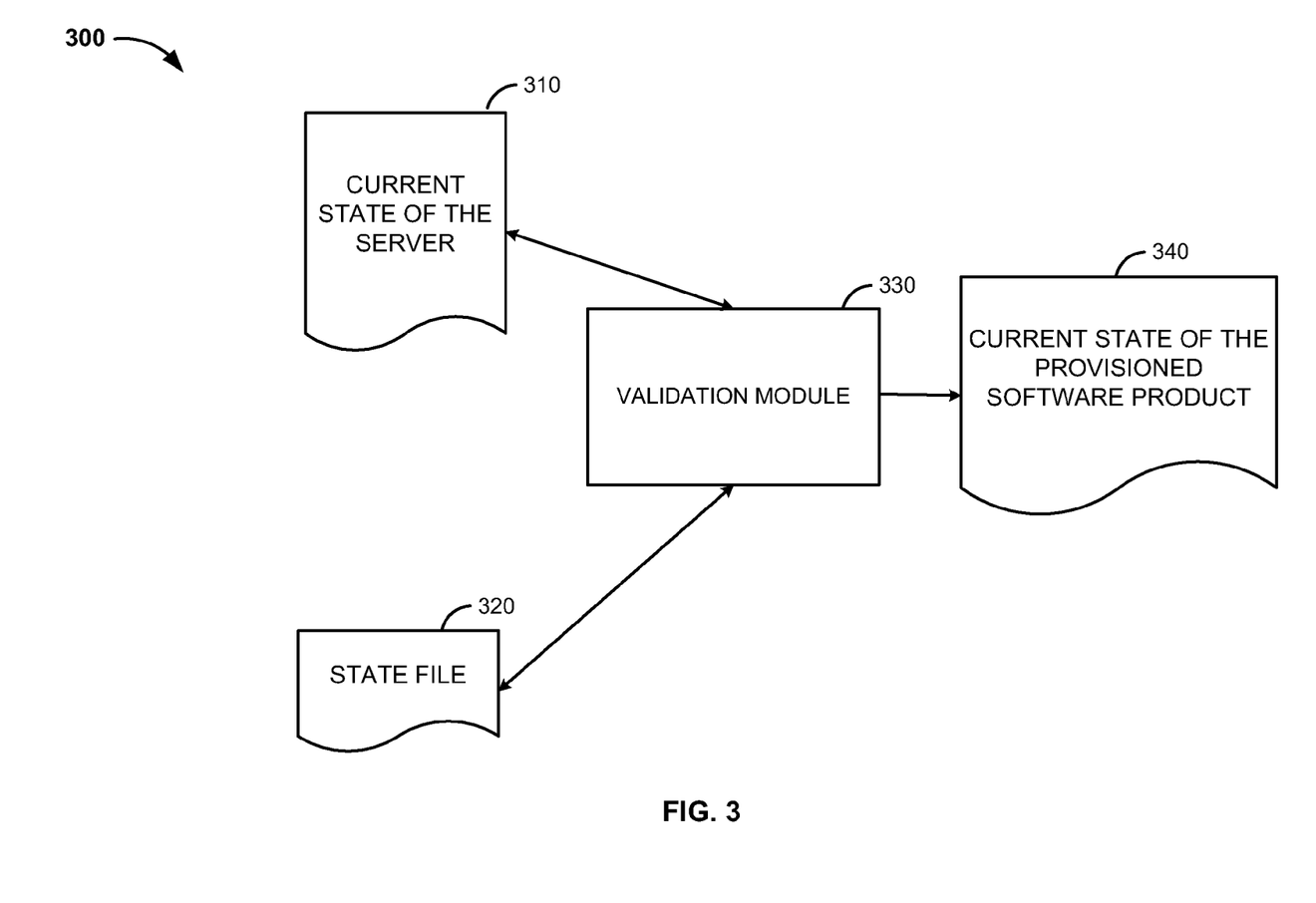
FIG. 3 is a block diagram illustrating an embodiment of a system for validation of a current state of a provisioned software product in a cloud environment.

FIG. 3 is a block diagram illustrating an embodiment of a system 300 for validation of a current state of a provisioned software product in a cloud environment. A validation module 330 evaluates the current state of the currently installed bundles on a server, such as the application server 165 (FIG. 1). The current states of the currently installed bundles can be extracted from the current state of the server 310. The validation module 330 also uses a state file 320 to compare the current state with the desired state of the installed bundles. The state file 320 includes the bundles to be installed with their desired state. The validation module 330 determines whether the current state of the provisioned software product 340 is desired or undesired. In one embodiment, the current state of the provisioned software product 340 can be provided together with a list of bundles that are not in a desired state, if the provisioned software product is in an undesired state. When the provisioned software product is in a desired state, it can serve user requests. If the provisioned software product is not in a desired state, this may mean that there are bundles that are defined in the state file but are not currently installed. On the other hand, for example, not being in a desired state can mean that the bundles that are currently installed are the bundles that are defined in the state file, but not all of them are in a desired state. In one embodiment, the bundles are not in a resolved state, the bundles are not in an activated state, etc.

Figure 4:
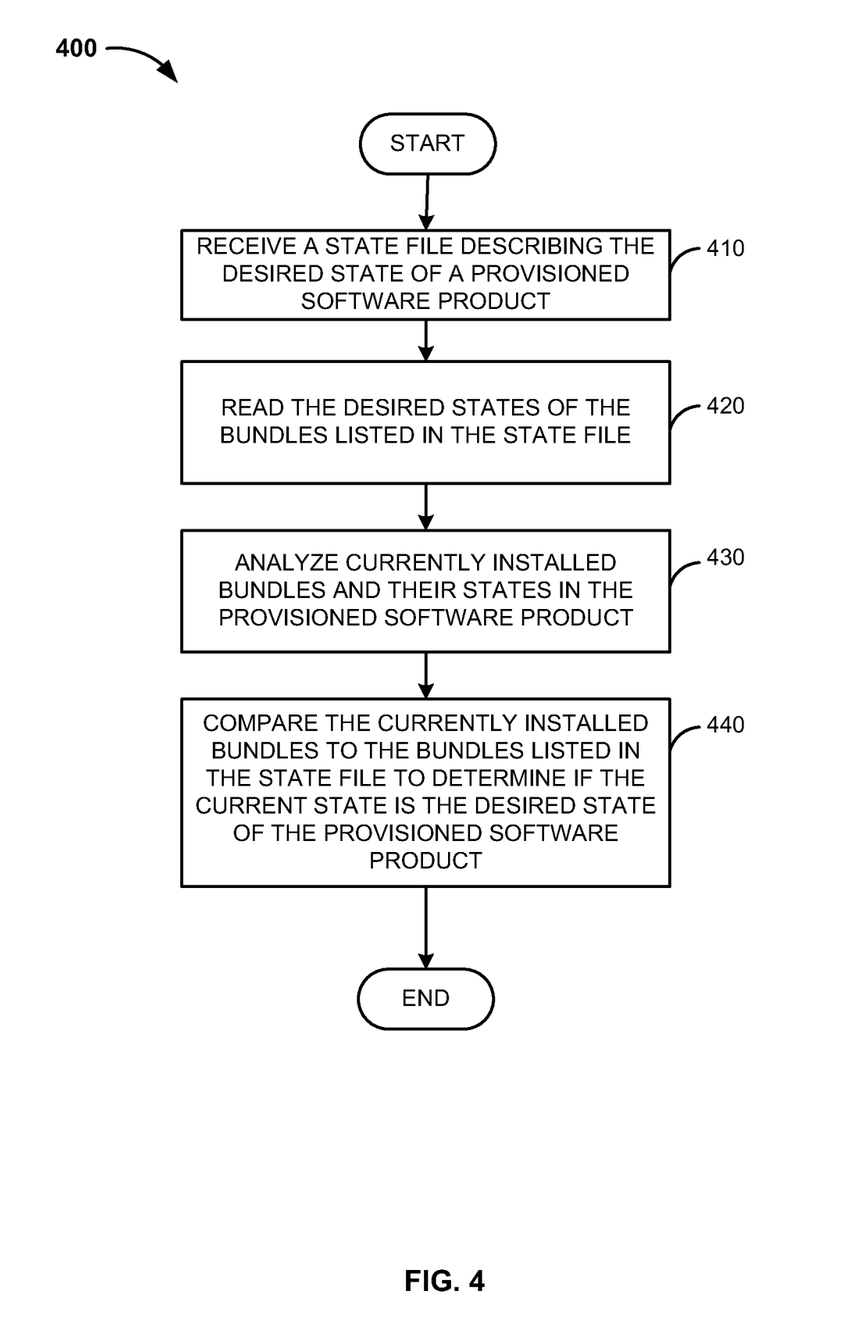
FIG. 4 is a flow diagram illustrating an embodiment of a method for validation of a current state of a provisioned software product in a cloud environment.

FIG. 4 is a flow diagram illustrating an embodiment of a method 400 for validation of a current state of a provisioned software product in a cloud environment. At process step 410, a state file is received. The state file describes the desired state of a provisioned software product. In one embodiment, the state file includes a list of bundles with their names and a desired state after provisioning the software product. In one embodiment, the software product that is provisioned can be a product based on an existing software product. The existing software product can be defined as a platform product that provides infrastructure for development of software applications, services, configuration, etc. The bundles that are specified in the state file are the bundles that are installed on a server, such as the application server 165 (FIG. 1). In one embodiment, the server can be installed on a VM, such as the VM 160 (FIG. 1). In one embodiment, the state file can be created during the installation of a component, such as the Component_1 at 125, on a server on a VM. For example, the state file can be saved on the server and can be received from the server. At process step 420, desired states of the bundles in the provisioned software product are read from the state file. At process step 430, currently installed bundles in the provisioned software product and current states of the currently installed bundles are analyzed. In one embodiment, the current states of the currently installed bundles can be read from a server that is used to host the provisioned software product. The state of the server can include the current states of the currently installed bundles. By reading the server's state, the current states of the bundles are also acquired and analyzed. At process step 440, the currently installed bundles are compared to the specified list of bundles in the state file to determine whether the current state of the provisioned software product is the desired state of the provisioned software product.

Figure 5:
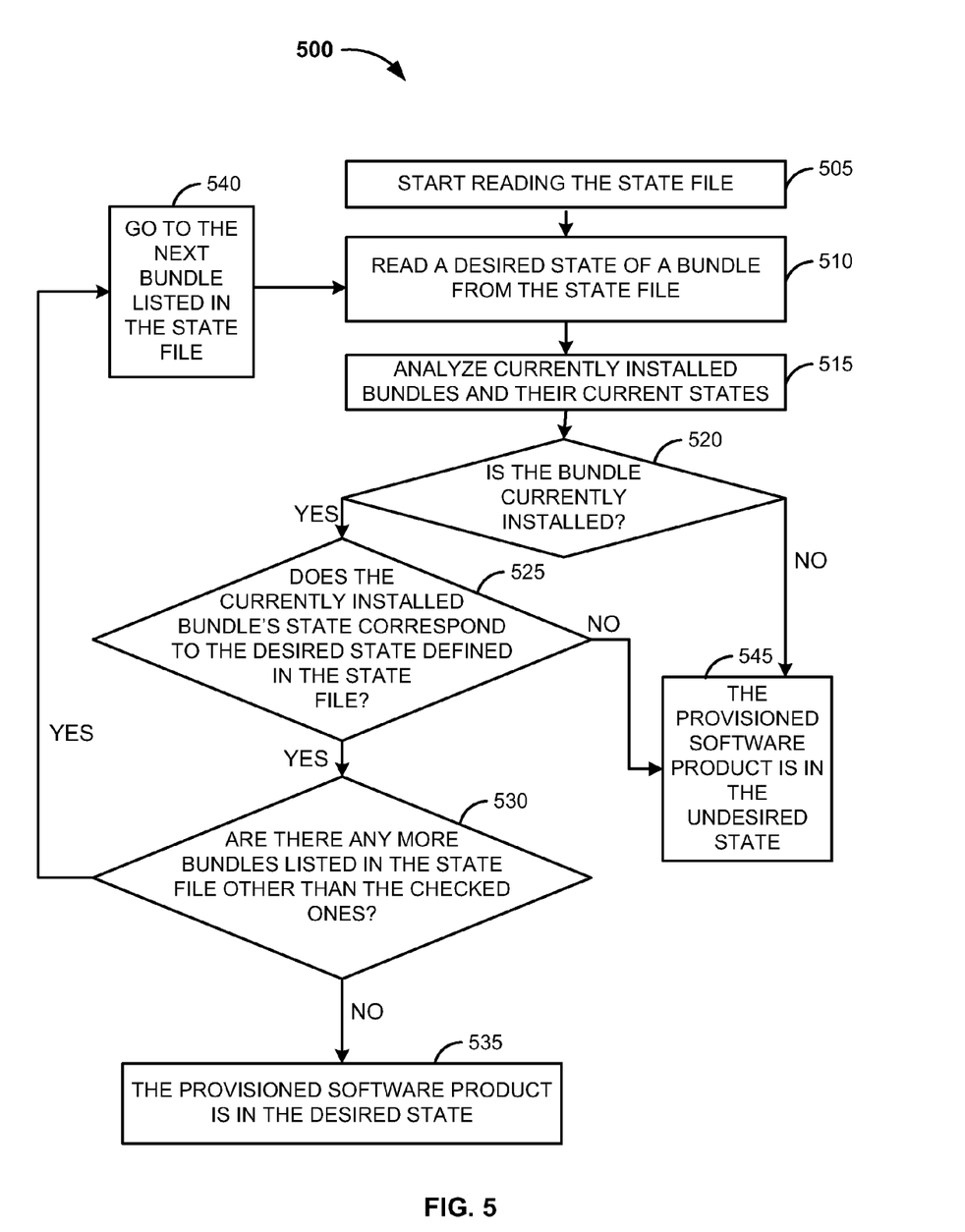
FIG. 5 is a flow diagram illustrating an embodiment of a method for determining whether a current state of a provisioned software product corresponds to a desired state of the provisioned software product.

FIG. 5 is a flow diagram illustrating an embodiment of a method 500 for determining whether a current state of a provisioned software product corresponds to a desired state of the provisioned software product. At process step 505, a state file, such as the state file 175 (FIG. 1), is read and at process step 510 the desired state of a bundle from the state file is read. At process step 515, currently installed bundles are analyzed and their current states are determined. At decision block 520, it is determined whether the read bundle from the state file is currently installed. If the read bundle is not installed, then the provisioned software product is not in the desired state as it is defined in the state file. If the read bundle is installed, then, at decision block 525 it is determined whether the installed bundle is in the desired state as it is defined in the state file. At the decision block 525, the current state of the currently installed bundle is compared to the desired state. For example, the read bundle from the state file at step 510 can be identified by name, id, etc., and then the bundle can be found in the analyzed currently installed bundles using the name, ID, etc. In one embodiment, the desired state of a bundle can be activated or not activated. In one embodiment, the current state of a bundle may not correspond to a defined state of the bundle in the state file. In one embodiment, the correspondence (e.g., match) between the current state and the desired state may not be limited to equivalency between the current state and the desired state. For example, in the state file, the desired state for a given bundle may be not activated. When checking the current state of that bundle, if it is, for example, in an installed state, which is in a not activated state, this does not mean that the criteria for the correspondence is met. In one embodiment, a bundle may have a boundary condition to be in at least a resolved state to be operational. If the currently installed bundle is not in the desired state as defined in the state file, then the current state of the provisioned software product is not the desired state that is defined at process step 545. If the currently installed bundle is in the desired state as defined in the state file, then the process goes to decision block 530 and determines whether there are more bundles listed in the state file that have not yet been compared with the currently installed bundles and the current states of these bundles. If there are more bundles in the state file that are not checked, a next bundle from the state file is found at process step 540. The bundle is processed at the process step 510. If there are no more bundles in the state file to be checked after evaluation done in the decision block 530, then at process step 535 the current state of the provisioned software product is validated to be the desired state as it is defined in the state file.

Figure 6:
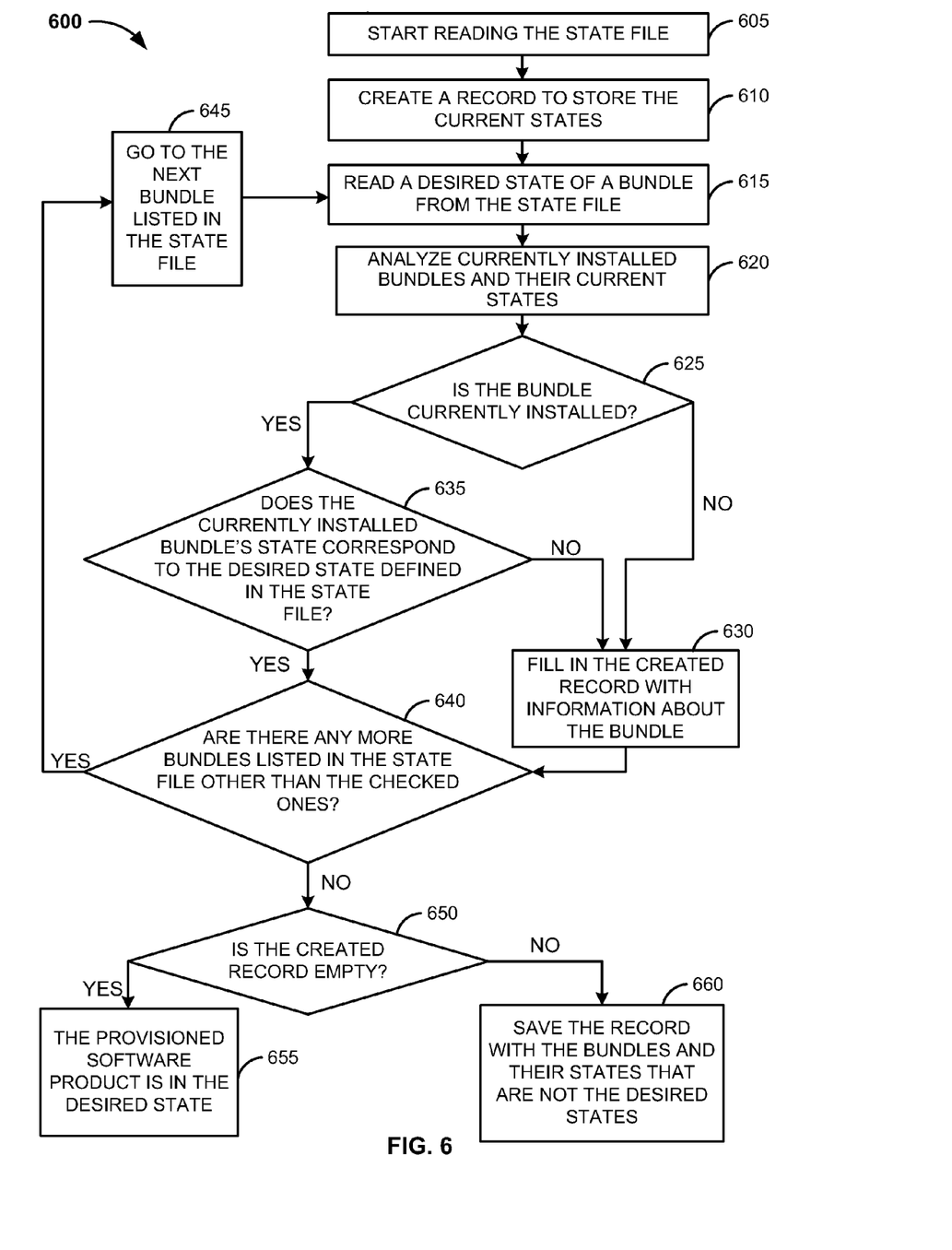
FIG. 6 is a flow diagram illustrating an embodiment of a method for identifying currently installed bundles whose current states differ from the desired states for the bundles.

FIG. 6 is a flow diagram illustrating an embodiment of a method 600 for identifying currently installed bundles whose current states differ from the desired states for the bundles. In one embodiment, at process step 605, the reading of a state file for a provisioned software product is started. At process step 610, a record is created that can be used for storing information for the bundles that are installed as part of a provisioned software product, such as the provisioned software product 235 (FIG. 2). At process step 615, the desired state of a bundle from the state file is read. At process step 620, currently installed bundles are analyzed and their current state is determined. At decision block 625, it is determined whether the read bundle from the state file is currently installed. If the read bundle is installed, then at decision block 635 it is determined whether the currently installed bundle's state corresponds to the desired state for the bundle that is defined in the state file. If the states do not correspond to one another, then at process step 630, the record (created at step 610) is filled in with information about the bundle. If the states correspond to one another, then at decision block 640 it is verified whether there are any more bundles in the state file that are not checked. If there are more bundles, at process step 645, a bundle from the list of bundles in the state file is taken and at the process step 615, the desired state of the bundle is read from the state file.

If the read bundle at process step 625 is not installed, then, at process step 630, the record (created at step 610) is filled in with information about the read bundle that was checked. If at decision block 640, it is determined that there are no more bundles listed in the state file that are not checked, then, at process step 650, it is determined whether the created record is empty or not. If the record is empty, then at process step 655, the provisioned software product is determined to be in the desired state. This means that there are no bundles in a different state than the desired state that is defined in the state file. If the record is not empty, then at process step 660, the record with the bundles that are either not installed or are not in the desired state is saved. The provisioned software product is not in the desired state. This means that there are bundles that are in a different state than the desired state that is defined in the state file. The record is filled in with information about the current states of the bundles that are different that the desired.

In one embodiment, a system may comprise one or more computing machine resources for provisioning and execution of a software product (e.g. product_1 180, FIG. 1), a processor, and a platform repository having bundles (e.g. platform repository 105, FIG. 1 and bundles 175, FIG. 1). The computing machine resources can be physical machines, virtual machine (e.g. VM 160, FIG. 1), data storage, etc. The system may comprise a platform infrastructure that can receive a descriptor of the provisioned software product and select bundles from the platform repository that are specified in the descriptor. In one embodiment, the descriptor includes information describing hardware and software resources to be employed during the provisioning and execution of the software product. In one embodiment, the platform infrastructure may select the available computing machine resources from the one or more computing machine resources and install the selected bundles from the platform repository. In one embodiment, the installation includes installation of a specified server to be used for the provisioning of the software product on the selected available computing machine resources. In addition, the rest of the selected bundles are installed on the server with a desired state. In one embodiment, the server can be an application server, such as application server 165, FIG. 1. The desired state is defined in a created state file during the installation where a desired state for the selected bundles is specified. For example, the state file can be such as state file 175, FIG. 1. The platform infrastructure can include instructions, which when executed on the processor, installs a validation module, such as the validation module 185, FIG. 1.

Figure 7:
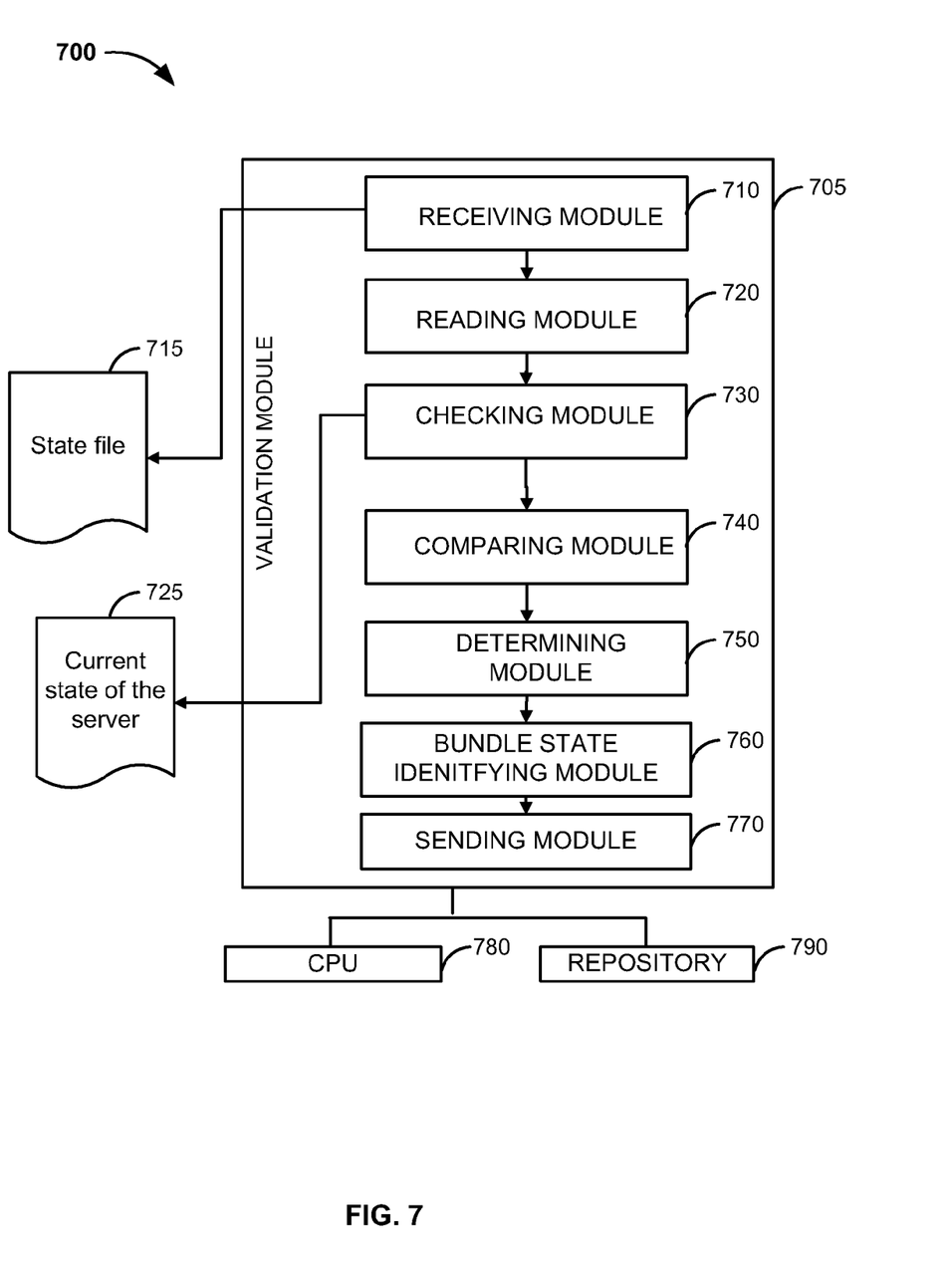
FIG. 7 is a block diagram illustrating an embodiment of a system for validation of a current state of a provisioned software product.

FIG. 7 is a block diagram illustrating an embodiment of a system 700 for validation of a current state of a provisioned software product. A validation module 705, such as the validation module 185 (FIG. 1), validation module 240 (FIG. 2), and validation module 330 (FIG. 3), validates the current state of the provisioned software product in a cloud environment. In one embodiment, the provisioned software product can be such as the provisioned software product 235 (FIG. 2). In one embodiment, the validation module 705 can include a receiving module 710, a reading module 720, a checking module 730, a comparing module 740, a determining module 750, a bundle state identifying module 760, and a sending module 770. In one embodiment, the receiving module 710 receives a state file 715, which describes a desired state of the provisioned software product with the desired states of the bundles that are part of the software product. The reading module 720 is in communication with the receiving module 710 and reads the desired states of the specified bundles in the provisioned software product. The checking module 730 in communication with the reading module 720, analyzes the current state of a server 725 that can be used for starting the provisioned software product. In one embodiment, the server can be an application server, such as the application server 165 (FIG. 1). In one embodiment, the current state of the server 725 can include the current states of the currently installed bundles during the provisioning process.

The comparing module 740 in communication with the checking module 730 and the reading module 720 compares the bundles specified in the state file 715 to the currently installed bundles and the current states of the currently installed bundles with the desired state of the bundles to determine if the current state of the provisioned software product corresponds to the desired state. In one embodiment, the determining module 750 in communication with the comparing module 740 defines if the current state of the provisioned software product is desired or undesired. In one embodiment, the determining module 750 can determine the current state to be undesired when the specified bundles in the state file differ from the currently installed bundles. In another embodiment, the determining module 750 can determine the current state to be undesired when the current states of the currently installed bundles differ from the desired states, as defined in the state file 715. In an embodiment, the determining module 750 can determine that the current state of the provisioned software product is desirable. The desirable state is determined when the specified bundles from the state file 715 correspond to the currently installed bundles and the current states of the currently installed bundles correspond to the desired states.

In one embodiment, the bundle state identifying module 760 in communication with the determining module identifies those of the currently installed bundles whose current states differ from the desired states, when the state of the provisioned product is undesirable. In another embodiment, the bundle state identifying module 760 can also determine those of the specified bundles in the state file that are not part of the currently installed bundles. The sending module 770 part of the validation module 705, and the sending module 770 in relation to the bundle state identifying module 760, can send notifications to inform a monitoring system, such as the monitoring system 205 (FIG. 2). In one embodiment, the notifications can include information about the current state of the started provisioned software product. In one embodiment, the defined bundles that are not in the desired state can be used for repairing the provisioned software product to be in a desired state by applying necessary actions to the defined bundles.

According to an embodiment, the validation module 705 can be associated with hardware, software, and data resources. In one embodiment, the validation module 705 is associated with a central processing unit (CPU) 780 and a repository 790 to assist during the process of validation of the current state of a provisioned software product. The CPU 780 is used to execute the program code. In one embodiment, the repository 790 is used for storing a record of bundles that are not in the desired state. For example, the bundles can be bundles that are not installed during the start of a provisioned software product. Another example are bundles that are installed during the start of the provisioned software product but whose current state is not the desired state defined in the state file for the provisioned software product.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
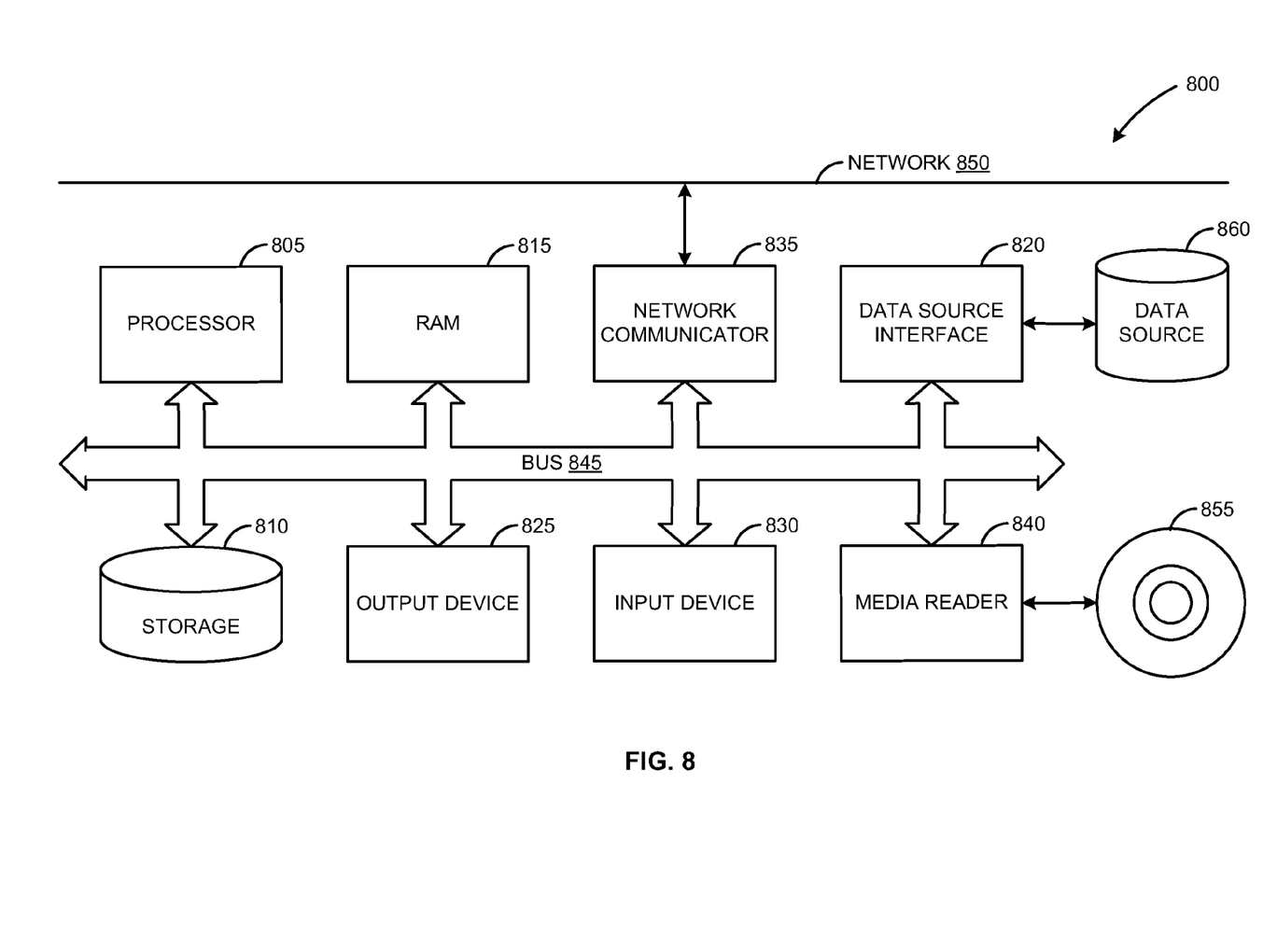
FIG. 8 is a block diagram illustrating an embodiment of a computing environment in which the techniques described for validation of a provisioned product's state can be implemented.

FIG. 8 is a block diagram illustrating an embodiment of a computing environment 800 in which the techniques described for validation of a provisioned product's state can be implemented. The computer system 800 includes a processor 805 that executes software instructions or code stored on a computer readable storage medium 855 to perform the above-illustrated methods of the invention. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to execute on a processor to validate a current state of a provisioned software product started in a cloud environment, the method comprising:

receiving a state file describing a desired state of the provisioned software product, the state file specifying bundles to be installed along with corresponding desired states of the bundles in the provisioned software product;

reading the desired states of the specified bundles to be installed;

analyzing currently installed bundles and current states of the currently installed bundles in the provisioned software product;

the processor, comparing the bundles specified in the state file to the currently installed bundles and the current states of the currently installed bundles with the desired states of the bundles to determine whether the current state of the provisioned software product corresponds to the desired state of the provisioned software product; and upon determining that the current state of the provisioned software product does not correspond to the desired state of the provisioned software product, repair the provisioned software product to be in the desired state using the specified bundles in the state file.

2. The method of claim 1, wherein the provisioned software product is started on an application server associated with the cloud environment.

3. The method of claim 2, wherein analyzing the currently installed bundles and the current states of the currently installed bundles in the provisioned product comprises:

analyzing a server state of the application server used for the provisioned product, wherein the server state comprises the current states of the currently installed bundles; and reading the current states of the currently installed bundles from the server state.

4. The method of claim 1, further comprising:

determining the current state of the provisioned software product to be in an undesired state when the specified bundles in the current state file differ from the currently installed bundles or when the current states of the currently installed bundles differ from the desired states.

5. The method of claim 1, further comprising:

determining the current state of the provisioned software product to be the desired state when the specified bundles from the state file correspond to the currently installed bundles and the current states of the currently installed bundles correspond to the desired states.

6. The method of claim 4, further comprising:

identifying one or more currently installed bundles whose current states differ from the desired states, when the current state of the provisioned software product is in the undesired state.

7. The method of claim 6, further comprising:

sending a notification informing a monitoring system about the current state of the started provisioned software product and specifying the identified one or more currently installed bundles.

8. An article of manufacture to validate a current state of a provisioned software product started in a cloud environment, comprising a non-transitory computer readable storage medium including executable instructions, which when executed by a computer, cause the computer to:

receive a state file describing a desired state of the provisioned software product, the state file specifying bundles to be installed along with corresponding desired states of the bundles in the provisioned software product;

read the desired states of the specified bundles to be installed;

analyze currently installed bundles and current states of the currently installed bundles in the provisioned software product;

compare the bundles specified in the state file to the currently installed bundles and the current states of the currently installed bundles with the desired states of the bundles to determine whether the current state of the provisioned software product corresponds to the desired state of the provisioned software product; and upon determining that the current state of the provisioned software product does not correspond to the desired state of the provisioned software product, repair the provisioned software product to be in the desired state using the specified bundles in the state file.

9. The article of manufacture of claim 8, wherein the provisioned software product is started on an application server associated with the cloud environment.

10. The article of manufacture of claim 9, wherein the instructions to analyze the currently installed bundles and the current states of the currently installed bundles in the provisioned product comprise instructions which when executed by a computer, cause the computer to:

analyze a server state of the application server used for the provisioned product, wherein the server state comprises the current states of the currently installed bundles; and read the current states of the currently installed bundles from the server state.

11. The article of manufacture of claim 8, further comprising instructions, which when executed by a computer, cause the computer to determine the current state of the provisioned software product to be in an undesired state when the specified bundles in the state file differ from the currently installed bundles or when the current states of the currently installed bundles differ from the desired states.

12. The article of manufacture of claim 8, further comprising instructions, which when executed by a computer, cause the computer to determine the current state of the provisioned software product to be the desired state when the specified bundles from the state file correspond to the currently installed bundles and the current states of the currently installed bundles correspond to the desired states.

13. The article of manufacture of claim 12, further comprising instructions, which when executed by a computer, cause the computer to identify one or more currently installed bundles whose current states differ from the desired states, when the current state of the provisioned software product is in the undesired state.

14. The article of manufacture of claim 13, further comprising instructions, which when executed by a computer, cause the computer to send a notification informing a monitoring system about the current state of the started provisioned software product and specifying the identified one or more currently installed bundles.

15. A system comprising:
one or more computing machine resources for provisioning of a software product;
a processor;
a platform repository for storing a plurality of bundles;
a platform infrastructure comprising instructions that, when executed on the processor:
receive a descriptor comprising information about the provisioned software product to be started on available computing machine resources from the one or more computing machine resources;
select the available computing machine resources;
select bundles from the platform repository specified in the descriptor for the provisioned software product;
install the selected bundles comprising:
installing a bundle specifying a server to host the provisioned software product on the available computing resources;
creating a state file describing a desired state of the provisioned software product, the state file specifying the selected bundles to be installed along with corresponding desired states of the bundles in the provisioned software product;
installing the rest of the bundles on the installed server; and
applying the desired states described in the state file; and
install a validation module on the installed server to validate a current state of the provisioned software product.

16. The system of claim 15, wherein the validation module comprises instructions that, when executed on the processor:
read the desired states of the specified bundles to be installed from the state file;
analyze currently installed bundles and current states of the currently installed bundles in the provisioned software product;
compare the bundles specified in the state file to the currently installed bundles and the current states of the currently installed bundles with the desired states of the bundles to determine whether the current state of the provisioned software product corresponds to the desired state of the provisioned software product;
identify bundles from the state file whose current states differ from the desired states, when the current state of the provisioned software product is in an undesired state;
send notifications to a monitoring system about the current state of the provisioned software product started on the available computing machine resources; and
the monitoring system in relation to the platform infrastructure and the one or more computing machine resources to receive notifications from the validation module about the current state of the provisioned software product.

17. The system of claim 15, wherein analyzing the currently installed bundles and the current states of the currently installed bundles in the provisioned product further comprises instructions to:
analyze a server state of the application server used for the provisioned software product, wherein the server state comprises the current states of the currently installed bundles; and
read the current states of the currently installed bundles from the server state.

18. The system of claim 15, further comprises instructions when executed on the processor:
determine the current state of the provisioned software product to be in the undesired state when the specified bundles in the state file differ from the currently installed bundles or when the current states of the currently installed bundles differ from the desired states.

19. The system of claim 15, further comprises instructions when executed on the processor:
determine the current state of the provisioned software product to be the desired state when the specified bundles from the state file correspond to the currently installed bundles and the current states of the currently installed bundles correspond to the desired states.

20. The system of claim 15, wherein upon determining that the current state of the provisioned software product does not correspond to the desired state of the provisioned software product, repair the provisioned software product to be in a desired state using the specified bundles in the state file.

* * * * *